US009201764B2

(12) United States Patent
Suevern et al.

(10) Patent No.: US 9,201,764 B2
(45) Date of Patent: Dec. 1, 2015

(54) METHOD AND DEVICE FOR CREATING AND TESTING A CONTROL UNIT PROGRAM

(71) Applicant: dSPACE digital signal processing and control engineering GmbH, Paderborn (DE)

(72) Inventors: Markus Suevern, Barntrup (DE); Anne Geburzi, Paderborn (DE)

(73) Assignee: dSPACE digital signal processing and control engineering GmbH, Paderborn (DE)

( * ) Notice: Subject to any disclaimer, the term of this patent is extended or adjusted under 35 U.S.C. 154(b) by 49 days.

(21) Appl. No.: 13/937,691

(22) Filed: Jul. 9, 2013

(65) Prior Publication Data
US 2014/0019942 A1    Jan. 16, 2014

(30) Foreign Application Priority Data

Jul. 10, 2012   (DE) .......................... 10 2012 211 981

(51) Int. Cl.
G06F 9/44        (2006.01)
G06F 11/36       (2006.01)

(52) U.S. Cl.
CPC ........ *G06F 11/3664* (2013.01); *G06F 11/3644* (2013.01); *G06F 11/3688* (2013.01)

(58) Field of Classification Search
USPC .................................................. 717/124–127
See application file for complete search history.

(56) References Cited

U.S. PATENT DOCUMENTS

| 8,713,528 | B1 * | 4/2014 | Conrad et al. | 717/124 |
| 8,856,726 | B2 * | 10/2014 | Conrad et al. | 717/104 |
| 2012/0084070 | A1 * | 4/2012 | Moore | 703/22 |
| 2012/0084759 | A1 * | 4/2012 | Candea et al. | 717/126 |
| 2012/0215407 | A1 * | 8/2012 | Goy | 701/48 |

OTHER PUBLICATIONS

Dr. Thomas Zurawka et al: "Test automation for control device software with architecture AUTOSAR";Professional talks the 2nd Auto Test 2008, Jan. 1, 2008, pp. 1-15, XP055071744.
"Messina 2.9 von Berness & Mattner: Neues Release verbessert AUTOSAR—Unterstützung für modellbaslertes Testen", Jan. 1, 2011, pp. 1-2, XP055071751.

(Continued)

*Primary Examiner* — Anna Deng
(74) *Attorney, Agent, or Firm* — Muncy, Geissler, Olds & Lowe, P.C.

(57) ABSTRACT

A development device and a method for creating and testing a control unit program, whereby the preparation of an intervention point for manipulating a quantity of a runtime environment for testing a control unit program component in a test environment having a test scenario program component and an observation device for receiving output values and indicating the test result. An executable program containing all program components is created from one or more program components, including a control unit program component that is to be tested and a test scenario program component. The creation includes generation of a runtime environment, wherein the runtime environment provides a communication channel for transmitting input and output values between the program components, and wherein a component test service is provided that offers an interface to the runtime environment pursuant to the AUTOSAR standard as an intervention point for manipulating a quantity of the runtime environment.

11 Claims, 3 Drawing Sheets

(56) References Cited

OTHER PUBLICATIONS

"Experiences with a CANoe-based fault injection framework for AUTOSAR"; Patrick E Lanigan et al: Dependable Systems and Networks (DSN), 2010 IEEE/IFIP International Conference on. IEEE. Piscataway, NJ, USA.

Johan Haraldsson et al: "Software Implemented fault injection for AUTOSAR based systems", (Jun. 1, 2012), pp. 1-48, XP055071755.

James Dickie et al: "ETAS' AUTOSAR-OS and-RTE Reach Maturity", (Jan. 1, 2009), pp. 34-35, XP055071753.

"MonkeyProof Data Dictionary Manager"; MonkeyProof Solutions BV; Jun. 25, 2012.

"Early Testing of AUTOSAR Components: analyzing individual software components instead of entire ECUS"; Dr. Carsten Böke, 28 Automotive 2010 AUTOSAR.

"Test von generierten AUTOSAR Basis-Software Komponenten"; Sylvia Engert; 2007; abstract.

"Components, Ports and AUTOSAR Interfaces"; http://www.autosar.org/index.php?p=1&up=2&uup=2&uuup=2&uuu . . . ; Apr. 1, 2012.

"Development of AUTOSAR Software Components within Model-Based Design"; Sandmann, G. and Thompson, R., SAE Technical Paper 2008-01-0383, 2008.

\* cited by examiner

METHOD AND DEVICE FOR CREATING AND TESTING A CONTROL UNIT PROGRAM

This nonprovisional application claims priority under 35 U.S.C. §119(a) to German Patent Application No. DE 10 2012 211 981.7, which was filed in Germany on Jul. 10, 2012, and which is herein incorporated by reference.

BACKGROUND OF THE INVENTION

1. Field of the Invention

The invention relates to a development device and a method for creating and testing a control unit program. The control unit program here is designed to control an electronic control unit in a vehicle.

2. Description of the Background Art

Development devices and methods for creating and testing control unit programs of the aforementioned type are known from the prior art. Generally, they serve the user as a development tool for creating, developing, testing, simulating, and/or calibrating control unit programs, for example for a real electronic control unit, or else a virtual electronic control unit (V-ECU) and/or a virtual processing unit (VPU).

A V-ECU is a virtual control device, which is to say a control unit program that has no direct hardware connection but that reflects all specific characteristics of the hardware. The V-ECU is integrated into a simulator in order to simulate the behavior of a real control device. V-ECUs can be used within the framework of an offline or real-time simulation. V-ECUs utilize interfaces of the simulator backplane in order to communicate with other control devices, models of the controlled system, or I/O drivers. In the user's perception, the V-ECU often stands in for his entire ECU, including all driver modules. In the technical sense, however, the V-ECU only comprises the parts of the program above the backplane interface, since the lower program levels are replaced by backplane modules of the specific simulator. At run time, the V-ECU is embedded in a frame (VPU) with the aid of a VPU integration code in order to make it into an executable simulator process. Within the scope of the present patent application, such an executable simulator process is described as an executable program. This executable program can be composed of one or more control unit program components and/or test scenario program components. The program components, in turn, can perform one or more different functions. Regardless of the number of integrated program components, just one runtime environment is generated. This permits testing of device program components in an existing program architecture. To this end, all that is required is for the particular program architecture to be expanded by test components and the runtime environment to be configured and regenerated.

A VPU is a virtual processing unit within the simulator on which an application that is to be simulated is executed. A VPU has its own allocated virtual computing resources (core), virtual memory (RAM), and virtual timer. These resources are independent of other VPUs, so the VPUs are simulated more or less in parallel. Likewise, the VPU has a separate set of OS resources (tasks, counters, alarms, events, critical sections, etc.). The utilization of I/O drivers and communication with other VPUs takes place through backplane services. In a real-time system, VPUs are generally executed on a separate physical core. In an offline simulation, the allocation of VPUs to cores is carried out dynamically by the underlying operating system of the simulation environment (Windows, for example).

An exemplary development device of the aforementioned type can be found in the product description of SystemDesk 3.1: (http://www.dspace.de/de/gmb/home/products/sw/system_architecture_software/system desk.cfm). SystemDesk is a tool for supporting the development of distributed electronic systems. SystemDesk is especially designed to create control unit programs that can be used within the framework of the standard known as the AUTOSAR (Automotive Open System Architecture) standard.

The known prior art development devices generally provide a user with a user interface for the development device, by which means a model or an architecture of the control unit program can be reproduced graphically, for example in the form of a tree structure with multiple program components, and can be processed. As the complexity of modern control unit programs and their models or architectures grows, so too does the complexity of the development devices to be used for producing such control unit programs. Early testing of individual program components has thus become an essential element of modern program development within the framework of complex program structures so as to be able to identify, at an earlier point in the development process, possible sources of error in the later process sequence. A method for model-based design that does not consider testing and validation steps as a final step in the process, but rather as a continuous, accompanying activity, is described in the publication by Sandmann, G. and Thompson, R., "Development of AUTOSAR Software Components within Model-Based Design," SAE Technical Paper 2008-01-0383, 2008. In addition to test scenarios such as are developed by design and test engineers, the method also provides means for automatically generating test cases such as are defined, for example, for MC/DC (modified condition/decision coverage) in the D0-178B Standard for Level A Software.

However, in addition to application-specific test scenarios, it is necessary to test that the individual applications function correctly with regard to possible errors that could occur in the process chain of data to be processed—such as, e.g., delay or failure of the internal signal transmission from one electronic control element to another. Previous implementations of test environments based on the AUTOSAR standard that consist of an application program component that is connected to a test scenario program component through a runtime environment already permit integrated tests of multiple electronic control units acting in conjunction with one another that are each considered as a separate black box, such as is described in "Testautomatisierung für Steuergeräte-Programme mit AUTOSAR Architektur" [test automation for control unit programs with AUTOSAR architecture] (http://www.fkfs.de/fileadmin/media/04_unternehmen/veranstaltungen/autotest/pdf dokumente/paper_2008/paper_11_SYSTECS_Zurawka.pdf), and all input and output signals of the control units are available for manipulations in a global data pool. Consequently, early testing in integrated form is already possible even for different states of development. The actual automatically generated AUTOSAR runtime environment is simulated by mechanisms of the test system.

Another test system is described in the publication, "Messina 2.9 von Berner & Mattner: Neues Release verbessert AUTOSAR-Unterstützung für modellbasiertes Testen" [Messina 2.9 from Berner & Mattner: new release improves AUTOSAR support for model-based testing], published in January 2011. Here, the Messina program creates a separate test runtime environment for each integrated program component of an integrated test on the basis of the AUTOSAR XML file. Communication of the individual test runtime environments is simulated by the means that a virtual function bus models the communication of the runtime environment interfaces, such as transmitter/receiver ports or client/server ports. In this way, imitation or testing of client/server operations is permitted. The applicable test runtime environments thus serve to connect the individual program component to the Messina platform.

SUMMARY OF THE INVENTION

It is therefore an object of the present invention to provide an improved development device and an efficient method for creating and testing a control unit program component that makes it possible to test the reaction of a control unit program component to interventions in the communication process between different program components pursuant to the AUTOSAR standard.

This object is attained in an embodiment by a method, wherein a component test service is provided that offers an interface to the runtime environment pursuant to the AUTOSAR standard as an intervention point for manipulating a quantity of the runtime environment and permits access to the quantity of the runtime environment by test scenario program components by means of suitable code generation for the runtime environment, wherein the quantity determines or describes or influences a process running over the communication channel.

In an embodiment, the method can include a provision of an intervention point for manipulating a quantity of a runtime environment for testing a control unit program component that is to be tested in a test environment having a test scenario program component for providing input quantities and having an observation device for receiving output values and indicating the test result. One or more program components are used here, including a control unit program component that is to be tested and a test scenario program component, each of whose interfaces are defined in accordance with the AUTOSAR standard. The connections between the input and output values of all program components are defined and an executable program of all program components is created. Here, creation includes generation of a runtime environment, wherein the runtime environment provides a communication channel for transmitting input and output values between the program components.

Within the scope of the present invention, the term "development device" can be understood as a device by means of which a user, which is to say for example a user of the development device, can develop, model, and create a control unit program. The control unit program that has been produced can then be used for simulation and/or for testing. The term "control unit program" can be understood within the scope of the present invention as a measurement, control, regulating and/or calibration program for controlling an electronic control unit in a vehicle. The term "control unit program" can cover individual program components with different functions as well as complex program architectures with multiple, interconnected program components. Within the scope of the present invention, the term "electronic control unit" can be understood as a control system, for example a control device in a motor vehicle. In this context, the electronic control unit can be used for measuring, controlling, regulating, and/or calibrating vehicle components. The term "vehicle" is used below as an inclusive designation for watercraft, land vehicles, aircraft, spacecraft, and/or combinations thereof.

The invention is based on the finding that, with increasing complexity of modern control unit programs, flexible testing of the different program components participating in the integrated test is necessary at different stages of development. In this process, it is not only necessary to test the tasks that are carried out by the individual program components, but also the reactions of these components to errors that occur during communication of the program components with one another, such as faulty signal transmission. For test purposes, it is likewise advantageous for it to be possible to manipulate individual quantities internal to the program during a test without the need to appropriately configure either the simulation or the control unit program components each time. Communication of the program components participating in the test takes place through a common runtime environment. After-the-fact intervention in generated executable programs based on the integrated program components and the runtime environment for the purpose of testing specific error conditions or specific predetermined events within the communication should be avoided here, since the underlying test scenario program components do not contain the information necessary to reproduce the error condition at a later stage with a newly generated executable program. On the other hand, the generation of a separate runtime environment for each program component in order to inject a communication error between the program components causes unnecessary complexity of the text environment.

A significant advantage of the invention resides in the fact that the behavior of the runtime environment can be influenced from outside within the framework of a component test or even an integrated component test. As a result, test scenario program components can be reused many times without further adaptation.

Within the scope of the present invention, a component test service of the runtime environment can be understood as a description for a port and an interface to the runtime environment pursuant to the AUTOSAR standard as an intervention point for manipulating a quantity of the runtime environment. The simulator process is informed of this description, for example through connecting the component test service to, e.g., a test scenario program component. During automatic generation of the executable program, the corresponding intervention interface for the runtime environment is then created in accordance with the defined intervention point. An interface of the test scenario program component can then be connected, according to the invention, to the intervention interface of the runtime environment, which is to say to the intervention point, consequently making it possible to intervene in the communication between the program components or between internal quantities of the individual program components.

With the generation of an executable program that includes the generation of a runtime environment, another advantage of the present invention is thus that runtime environment variables are also described in addition to the program variable descriptions customarily produced, so that runtime environment variables can be set directly with the aid of experimental and test automation tools.

According to an embodiment of the method according to the invention, the method can additionally be configured such that the provision of an observation device comprises: provision of an observation program component whose interfaces are each defined pursuant to the AUTOSAR standard.

According to an embodiment of the method according to the invention, the quantity of the runtime environment is specified by a parameter, a variable, or a function of the runtime environment.

Program components that communicate with one another through a runtime environment must call what are known as "application program interfaces," API functions, which represent basic functions for application programs. Thus, each test scenario program component for transmitting a data element through the runtime environment must have a runtime read call and a runtime write call.

According to an embodiment of the method according to the invention, the method can further be configured such that the quantity of the runtime environment is a status parameter that describes the status of a data element transmitted through a runtime read call or runtime write call, wherein the status describes the validity or trustworthiness or an error type of the data element. By means of a direct access to the parameter, therefore, a desired status can be set, and thus a defined error can be injected and the reaction of the control unit program component to this error tested.

According to another embodiment of the method according to the invention, the method can further be configured such that the quantity of the runtime environment is additionally a runtime environment event parameter. This parameter allows the triggering of a runtime environment event as defined in the AUTOSAR standard. Thus, for example, triggering of a "DataReceivedErrorEvent" can trigger an error message to the transmitting program component. As is evident from the description of the AUTOSAR standard, the "DataWriteCompleteEvent" and "Background/TimingEvent" events are triggered at regular intervals. Each of these events can be selectively triggered through the direct access to the event parameter.

According to another embodiment of the method according to the invention, the access includes manipulation of the quantity of the runtime environment that is used by a function or by different functions of the same program component or by different program components. In addition to the transmission of a data element from one program component to another, different functions of one and the same program component can exchange data elements through the runtime environment. Consequently, it is also possible to influence the communication of various functions of a program component through the access according to the invention to the quantity of the runtime environment.

A control unit program component for controlling a turn signal is described for illustrative purposes. This component could consist of 3 functions, so-called runnables, which perform different tasks. One function reads the calibration factor of the flash rate by means of a calibration port, and provides it as a data element in the InterRunnable variables. The second function receives the current state of a hazard warning switch through a receiver port. This function, in turn, makes its value available to other functions by means of an additional InterRunnable variable. The two values of the variables are read and evaluated by the third function, which defines the actual turn signal control. This function then transmits the messages through a sender port to the two actuators that switch the signal lights.

According to another embodiment of the method according to the invention, the access to a quantity of the runtime environment includes the simultaneous access to multiple quantities of the runtime environment. Due to the integration of multiple component test services, the corresponding intervention interfaces and intervention points of the runtime environment are available after generation of the executable program, so that multiple quantities of the runtime environment can also be set simultaneously through appropriate selection in the test scenario program component.

According to another embodiment of the method according to the invention, the control unit program component and the test scenario program component are located on a virtual electronic control unit, or the control unit program component is located on a first virtual electronic control unit and the test scenario program component is located on a second virtual electronic control unit.

In order to be able to test the later behavior of an electronic control unit and the interaction of different electronic control units as soon as the early stages of development, they are represented by virtual electronic control units. In this context, the test scenario program component can be located on the same virtual control unit as the control unit program component or can be on another virtual electronic control unit participating in the integrated test.

According to another embodiment of the method according to the invention, the test scenario program component determines a point in time and/or the range of validity in the program flow at which the predetermined intervention in the communication process is to take place.

The precise access can be determined, both with regard to time as well as in terms of the individual program components participating in the test, through an appropriate instruction in the test scenario program component. Thus, a quantity of the runtime environment can be manipulated for one component, for example, while this same quantity remains unaffected for another program component. It is likewise possible to manipulate the quantity only at a specific point in time, so that the manipulation takes place at a desired time in the program flow.

According to another embodiment of the method according to the invention, the executable program comprises switching on and off the predetermined intervention in the communication process by the test scenario component.

During creation of the executable program in this embodiment, the program functions of the executable program that are necessary in order to allow the program to run with a manipulated quantity for the runtime environment, and also with the original quantity, are generated. In this regard, the test scenario program component transmits a test signal that contains both the quantity of the runtime environment and an activation variable that determines whether the quantity is to be manipulated or not. In a preferred embodiment, the component test service has a switch function in accordance with its configuration with which the manipulation is or is not switched on according to the value of the activation variable.

In an embodiment, the specification or configuration of the interface description, which is to say of the component test service, is performed by the user through a graphical user interface, for example by selecting specific predefined component test services.

The aforementioned object is additionally attained by a development device for providing an intervention point for manipulating a quantity of a runtime environment for testing a control unit program component to be tested in a test environment. The test environment comprises a test scenario program component for providing input values and an observation device for receiving output values and indicating the test result. The development device has an electronic computing device that is designed to generate a runtime environment, wherein the runtime environment provides a communication channel for transmitting input and output values between the program components; the electronic computing unit provides a component test service that offers an interface to the runtime environment pursuant to the AUTOSAR standard as an intervention point for manipulating the quantity of the runtime environment, and permits access to the quantity of the runtime environment by the test scenario program component by means of suitable code generation for the runtime environment, wherein the quantity determines or describes or influences a process running over the communication channel.

The observation device preferably indicates the reaction of the control unit program component during execution of the executable program, wherein an error in the communication process that is predetermined by the test scenario program component or a predetermined manipulation of the communication process is entered or simulated by means of the quantity of the runtime environment, and wherein the reaction of the control unit program component to the error or the manipulation in the communication process between the program components is tested.

Within the scope of the present invention, an electronic computing unit can be understood as a component of a computer system, for example a personal computer (PC) or workstation. In this context, the electronic computing unit can execute a program, for example, so that the computer system is configured as a development device for creating a control unit program and/or for carrying out the method according to the invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
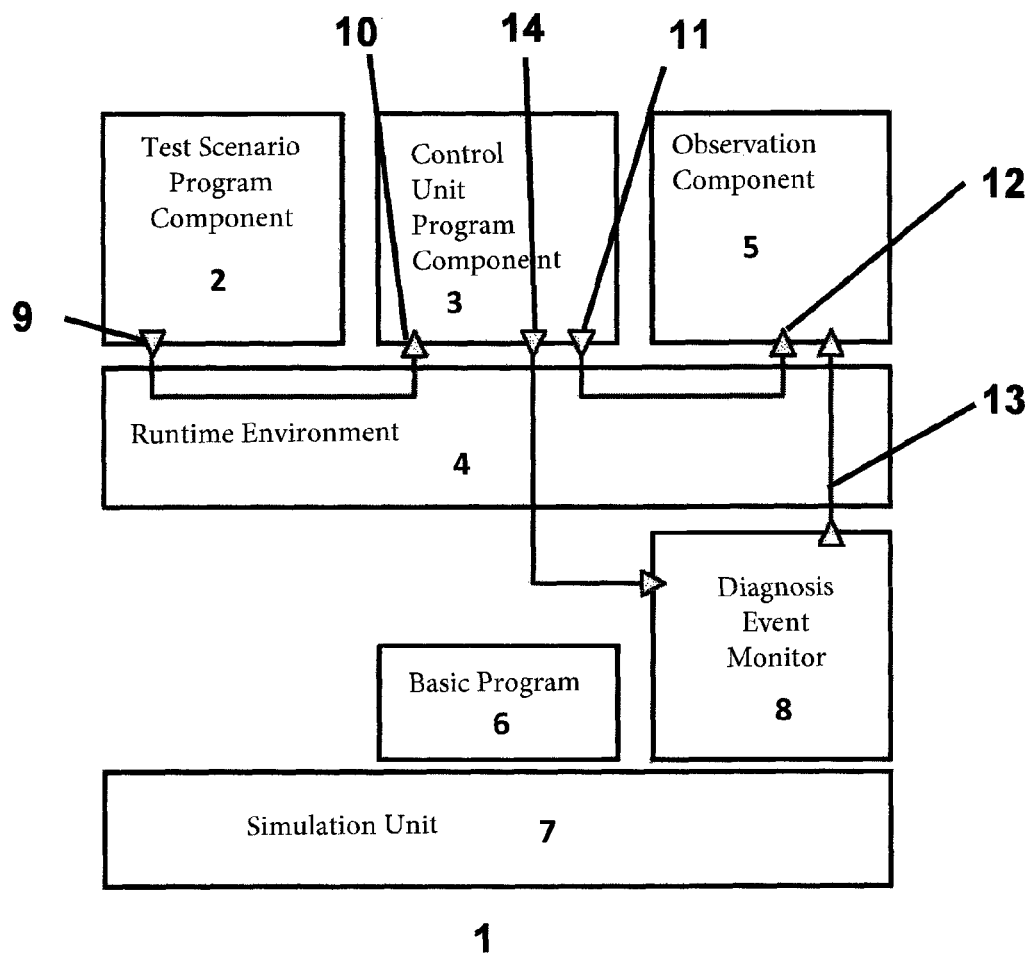
FIG. 1 is a schematic structure of a virtual test environment for testing a program component as is known from the conventional art.

FIG. 1 schematically shows the structure of a virtual test environment 1, configured in the customary way pursuant to the AUTOSAR standard. A subdivision into three levels can be seen here. The integrated program components 2, 3, and 5, which define the functionality of a control unit program, constitute the highest level here. A level with basic programs 6 and 8 that are close to the hardware constitutes the foundation of the structure. The connecting level 4 represents the runtime environment through which the program components can interact with one another and/or with the basic programs. Using development devices such as SystemDesk, it is possible to model and test not only one program component, but also an integrated set of multiple program components. In this context, the functionality and interoperation of the integrated program components is simulated by the linkage to a simulation unit 7 (also referred to as a simulator backplane), which is to say the program consisting of a program component or a plurality of program components is executed by the simulation unit 7. During this process, the interface 10 of a control unit program component 3 to be tested is connected to the interface 9 of a test scenario program component 2. By means of the test scenario program component 2, a test signal is generated for the program component 3 to be tested, which is then transmitted as an output signal by the test scenario program component 2 through the runtime environment as an input signal for the control unit program component 3. In FIG. 1, the interface 11 of the control unit program component 3 is connected to the interface 12 of an observation program component 5, so that after the simulation has been run it is possible to test using the output signal of the control unit program component 3, which is communicated to the observation component 5 via the runtime environment, whether the control unit program component 3 has reacted as desired to the test signal received at the start. Other observation components may also be used in place of the observation program component 5: thus, readout of the test result can also take place from the memory of the Diagnosis Event Monitor (DEM) 8, or by means of diagnosis display at run time or similar indicator devices.

Communication of the program components with one another takes place through the runtime environment 4 here. As the connecting level, it provides the program components with a platform that is independent of the operating system 6; this platform provides basic functions to the program components that are required for communication between the program components—such as read and write calls, for example. Creation of the runtime environment and the underlying program code takes place automatically here based on the definitions and specifications of the integrated program code. The runtime environment is regenerated accordingly for each new constellation of integrated program components. The communication channel that is modeled by the runtime environment corresponds here to signal transmission over a bus in the electronic control unit to be realized. Consequently, it is necessary to test the functionality of the control unit program components in the event of malfunctions or failures of the bus, and hence of the communication channel.

Figure 2:
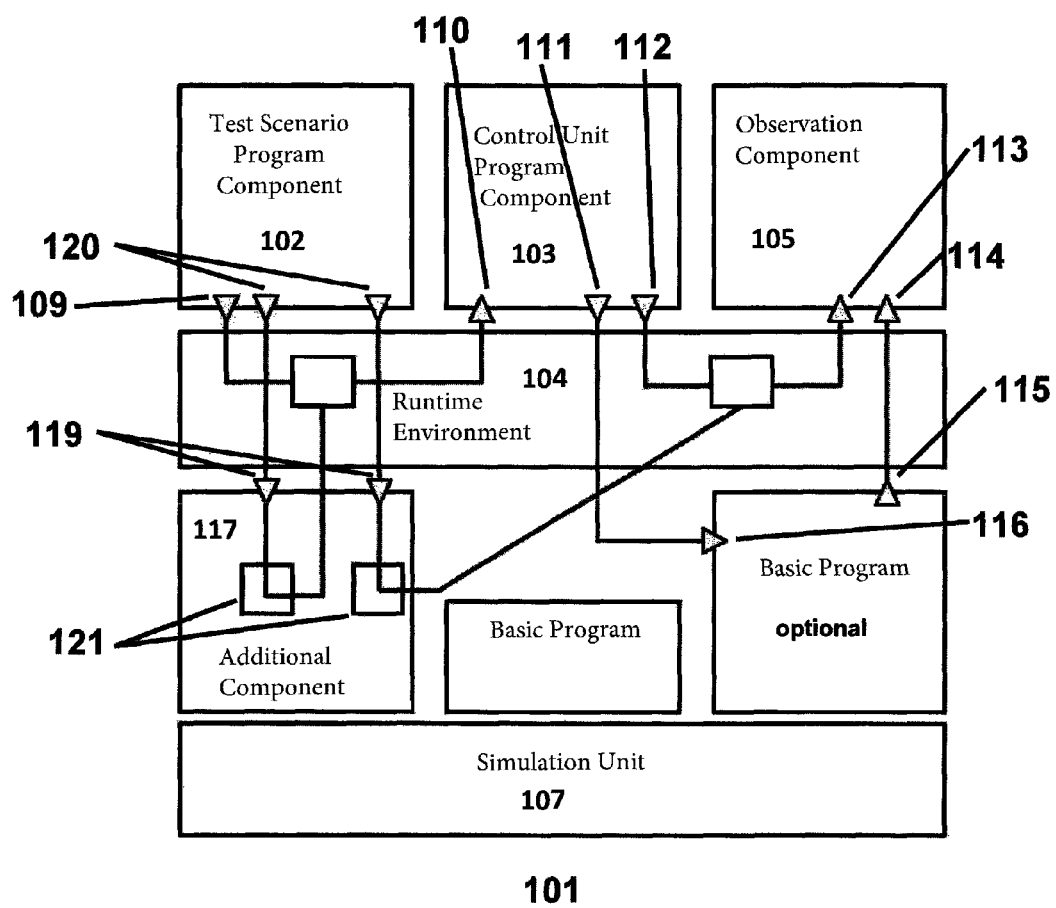
FIG. 2 is a schematic structure of a virtual test environment for testing a program component corresponding to the method according to an embodiment of the invention.
Figure 3:
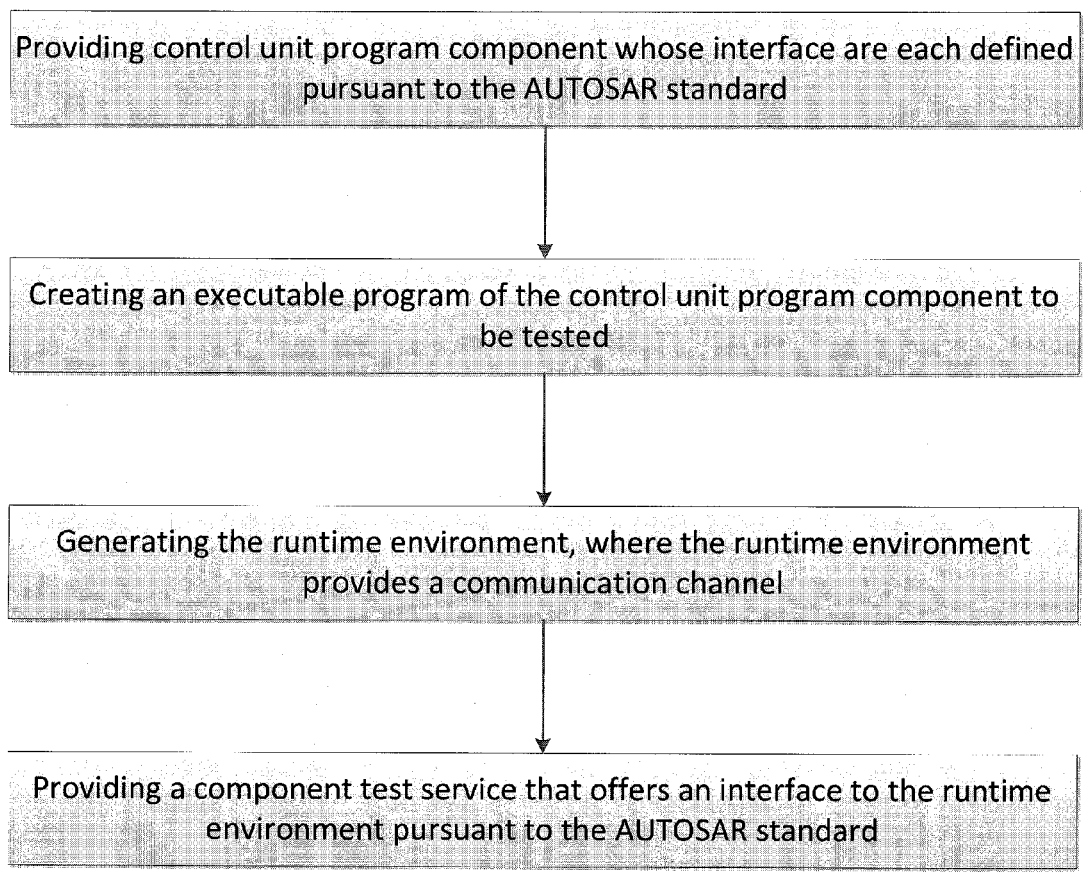
FIG. 3 is a method of a virtual test environment according to an embodiment of the invention.

FIG. 2 shows the schematic structure of a virtual test environment 101 corresponding to the method according to the invention. The layer of the basic programs that are close to the hardware in this design includes an additional component 117 that contains descriptions of ports and interfaces pursuant to the AUTOSAR standard for the runtime environment. These descriptions can be integrated into the virtual test environment 101 as component test services. Now the test scenario program component 102 is connected through the interface 109 to the interface of the control unit program component 103 to be tested, and is also connected through the interface 120 to an interface 119 of the runtime environment, which permits access to a quantity of the runtime environment through the component test service 121. In this way, it is possible to inject error conditions concerning the communication channel between the interface 109 and the input of the control unit program component 110 to be tested, or also between the output of the control unit program component 112 and the input of an additional program component 113. This additional program component 113 can be an observation program component in this design. As before, the runtime environment 104 is still generated automatically after all required program components—including the component test services 121—have been integrated.

The invention being thus described, it will be obvious that the same may be varied in many ways. Such variations are not to be regarded as a departure from the spirit and scope of the invention, and all such modifications as would be obvious to one skilled in the art are to be included within the scope of the following claims

What is claimed is:

1. A method for providing an intervention point for manipulating a quantity of a runtime environment for testing a control unit program component that is to be tested in a test environment having a test scenario program component for providing input quantities and having an observation device for receiving output values and indicating the test result, the method comprising:
providing the control unit program component whose interfaces are each defined pursuant to the AUTOSAR standard;
creating an executable program of the control unit program component to be tested and of the test scenario program component;
generating the runtime environment, wherein the runtime environment provides a communication channel for transmitting the input and output values;
providing a component test service that offers an interface to the runtime environment pursuant to the AUTOSAR standard as an intervention point for manipulating the quantity of the runtime environment and permits access to the quantity of the runtime environment by test scenario program components via suitable code generation for the runtime environment, the quantity determining or describing or influencing a communication process running over the communication channel; and
executing the executable program,
wherein an intervention in the communication process that is predetermined by the test scenario program component takes place via a manipulation of the quantity of the runtime environment through the intervention point, and
executing the executable program,
wherein an invention in the communication process that is predetermined by the test scenario program component takes place via a manipulation of the quantity of the runtime environment through the intervention point, and
wherein a reaction of the control unit program component to the manipulation of the communication process between the program components is tested in that the reaction of the control unit program component is acquired by the observation device.

2. The method according to claim 1, wherein the observation device is an observation program component whose interfaces are each defined pursuant to the AUTOSAR standard.

3. The method according to claim 1, wherein the quantity of the runtime environment is specified by a parameter, a variable, or a function of the runtime environment.

4. The method according to claim 1, wherein the quantity of the runtime environment is a status parameter that describes the status of an input or output value, and wherein the status describes the validity or the trustworthiness or an error type of the input or output value.

5. The method according to claim 1, wherein the quantity of the runtime environment is a runtime environment event parameter that makes possible the triggering of a runtime environment event.

6. The method according to claim 1, wherein the access to the quantity of the runtime environment comprises: manipulating the quantity of the runtime environment that is used by one function or by several functions of the same program component or by different program components.

7. The method according to claim 1, wherein access to a quantity of the runtime environment comprises substantially simultaneous access to multiple quantities of the runtime environment.

8. The method according to claim 1, wherein the control unit program component and the test scenario program component are located on a virtual electronic control unit, or wherein the control unit program component is located on a first virtual electronic control unit and the test scenario program component is located on a second virtual electronic control unit.

9. The method according to claim 1, wherein the test scenario program component additionally determines a point in time and/or a range of validity in the program flow at which the predetermined intervention in the communication process is to take place.

10. The method according to claim 1, wherein the executable program comprises: switching on and off the predetermined intervention in the communication process by the test scenario component.

11. A development device for providing an intervention point for manipulating a quantity of a runtime environment for testing a control unit program component to be tested in a test environment having a test scenario program component for providing input values and an observation device for receiving output values and indicating the test result, the device includes a hardware memory comprising:
an electronic computing unit that is configured to generate an executable program from the control unit program component to be tested whose interfaces are defined pursuant to the AUTOSAR standard and from the test scenario program component,
wherein the electronic computing unit is also configured to generate a runtime environment, the runtime environment providing a communication channel for transmitting input and output values,
wherein the electronic computing unit is configured to provide a component test service that offers an interface to the runtime environment pursuant to the AUTOSAR standard as an intervention point for manipulating the quantity of the runtime environment, and permits access to the quantity of the runtime environment by the test scenario program component via suitable code generation for the runtime environment, the quantity determining or describing or influencing a communication process running over the communication channel, and
wherein the electronic computing unit is configured to executing the executable program,
wherein an intervention in the communication process that is predetermined by the test scenario program component takes place via a manipulation of the quantity of the runtime environment through the intervention point, and
wherein a reaction of the control unit program component to the manipulation of the communication process between the program components is tested in that the reaction of the control unit program component is acquired by the observation device.

* * * * *